United States Patent
Saur et al.

[11] Patent Number: 5,897,055
[45] Date of Patent: Apr. 27, 1999

[54] ACTUATOR WITH AN ELECTRICALLY HEATABLE THERMOSTATIC OPERATING ELEMENT

[75] Inventors: Roland Saur, Stuttgart; Matthias Fahr, Ludwigsburg, both of Germany

[73] Assignee: Behr Thermot-tronik GmbH & Co., Germany

[21] Appl. No.: 09/022,502

[22] Filed: Feb. 12, 1997

[30] Foreign Application Priority Data

Feb. 14, 1996 [DE] Germany ............... 197 05 721

[51] Int. Cl.⁶ .................. H01H 61/01; H01H 61/013; F16T 1/02
[52] U.S. Cl. .................. 337/393; 337/123; 337/139; 337/141; 337/394; 337/395; 236/59
[58] Field of Search ............... 337/31, 123, 139, 337/141, 298, 382, 393, 394, 395, 396, 397, 306, 324; 236/41, 60, 87, 96, 43, 5, 19, 33, 66, 101, 59

[56] References Cited

U.S. PATENT DOCUMENTS

| 4,225,841 | 9/1980 | Saur et al. | 337/393 |
| 4,389,629 | 6/1983 | Saur et al. | 337/126 |
| 4,513,570 | 4/1985 | Yoshida et al. | 60/529 |
| 5,270,799 | 12/1993 | Rose | 337/354 |

FOREIGN PATENT DOCUMENTS

26 25 561 A1  8/1977  Germany.

Primary Examiner—Leo P. Picard
Assistant Examiner—Anatoly Vortman
Attorney, Agent, or Firm—Kennedy Covington Lobdell & Hickman, LLP

[57] ABSTRACT

An actuator with an electrically heatable operating element, the housing of the operating element being held stationary in a mount of a base body, and a transfer element, which comprises two plastic molded parts, is provided between the piston and the element to be adjusted.

23 Claims, 6 Drawing Sheets

ACTUATOR WITH AN ELECTRICALLY HEATABLE THERMOSTATIC OPERATING ELEMENT

FIELD OF THE INVENTION

The invention relates to an actuator having an electrically heatable thermostatic operating element, whose housing is held stationary in a mount of a base body; the base body has a platform for receiving an outer housing, and on the side of this platform remote from the mount is a securing device within whose region there is a support for the element to be actuated. The support is a component of a two-part transfer element that extends through the platform and forms a follower for an operating piston that projects out of the end of the housing of the operating element remote from the platform.

BACKGROUND OF THE INVENTION

In an actuator of this general type, such as known from German Patent Disclosure DE 26 25 561 A, the housing of the thermostatic operating element, with which a heating element is associated, is disposed in stationary fashion. The electric supply lines to the housing and/or to the electric heating element therefore do not move during operational movement of the actuator, and so the risk of mechanical damage to the electrical supply lines and their terminals is slight.

SUMMARY OF THE INVENTION

The object of the present invention is to embody an actuator of the type referred to in which the functional reliability can be increased and production costs can be reduced.

This object is attained by forming the transfer element in two interlocked plastic molded parts.

Such plastic molded parts can be produced in a simple way and above all economically in molds that are especially suitable for their function and that in particular allow secure guidance during the adjusting motion. Moreover, the plastic molded parts offer the possibility of designing these plastic molded parts in a simple way such that they can take on additional functions and/or receive additional components.

In an advantageous feature of the invention it is provided that the two parts of the transfer element are interlocked, which allows easy assembly and means that after being assembled, the transfer element behaves like a component made in one piece.

In a further feature of the invention, it is provided that the part of the transfer element that is associated with the device to be actuated has a plate forming the support, from which a plurality of posts protrude that penetrate the platform of the base body and are joined by interlocking to the other part of the transfer element. In this feature it suffices for only the part of the transfer element associated with the device to be actuated to be centered, specifically in recesses of the platform, since because of the interlocking the other part is then jointly centered as well.

In a further feature of the invention, it is provided that the part of the transfer element that is associated with the operating piston is loaded by a compression spring that is supported on the outer housing. In a further advantageous feature it is provided that the compression spring is disposed in an annular chamber between the outer housing and the part of the transfer element associated with the operating piston, which chamber, for supporting the spring, is provided with an annular collar. This feature makes it possible to accommodate a suitably dimensioned spring without thereby increasing the structural height of the actuator.

In a further feature of the invention, it is provided that the platform of the base body is provided with a lateral recess for the introduction of an electrical cable, which extends into the region between the posts of the mount and the posts of the transfer element as far as the operation element. Expediently, it is also provided that the recess of the flange is covered by means of the outer housing, and that the outer housing and/or the recess of the platform interengage with the cable to fix the cable in place and isolate the cable connection from any exterior tension.

In a further feature of the invention, it is provided that the securing device includes a neck, protruding from the flange of the base body, against which neck the base plate, forming the support for the device to be actuated, is sealed by a moisture-barrier seal. This prevents moisture or liquid that might escape from the region of the element being actuated from entering the interior of the actuator.

Expediently, for the sake of further sealing, it is provided that a seal is disposed between the platform of the base body and the outer housing.

In a further feature of the invention, it is provided that an electrical switch is provided which can be actuated by means of the motion of the transfer element. This switch can control auxiliary functions, in a known way.

In an advantageous feature it is provided that the electrical switch and a switch operating cam are disposed between the piston-following face of the transfer element and the outer housing. This region is advantageous for containing the electrical switch and the operating cam, because in this region other functions are not hindered by the presence of the switch and cam.

In a further feature, it is expediently provided that the switch operating cam and the electrical switch are adjusted relative to one another by elements on the transfer element. Since the cam and switch are adjusted on the same component, no problems with regard to adherence to tolerances arise.

Further advantages and characteristics of the invention will become apparent from the ensuing description of the embodiments shown in the drawings.

DESCRIPTION OF THE PREFERRED EMBODIMENT

Figure 1:
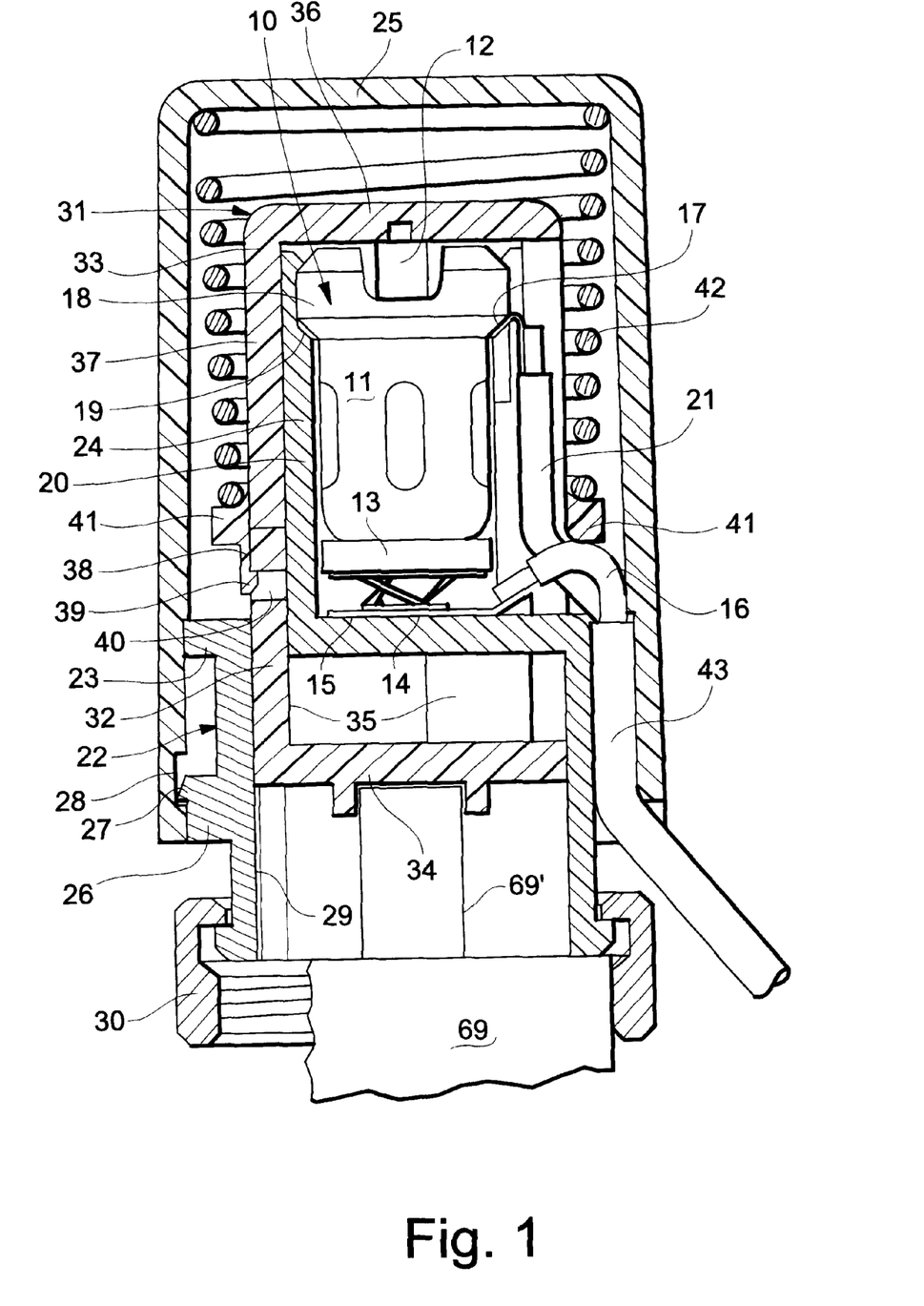
FIG. 1 is a vertical sectional view of a first embodiment of the actuator of the present invention.

The actuator shown in FIG. 1 includes a thermostatic operating element 10, which has a metal housing 11 out of which an operating piston 12 can be projected. The housing 11 includes an expanding material, in particular a wax mixture, which changes its volume as a function of temperature and correspondingly drives the operating piston 12 outward as a function of temperature. This thermostatic operating element 10 is a conventional unit such as used in thermostatic valves in cooling circuits of automobile engines. Located under the housing 11 is an electrical heating element 13, in particular a positive temperature coefficient (PTC) resistor. The PTC resistor, which is in the form of a circular disk, is pressed by a compression spring element 14 against the bottom of the housing 11. In addition, the heating element 13 is held on the bottom of the housing 11 by means of an electrically conductive adhesive. A spring element 14 is supported on a contact plate 15 on the platform of a stationary base body 22, to which contact plate a power supply line 16 is connected to electrically connect the electrical line to the heating disc through the plate and spring. A second electrical terminal is formed by a contact ring 17, which is disposed between an annular flange 18 of the housing 11 and an annular seat 19 of a mount 20. A second electrical line 21 is connected to this contact ring 17.

The mount 20 is a component of the base body 22, produced from a heat-proof plastic and forming a platform 23, from which the mount 20 projects. The mount 20 forms the aforementioned seat 19, which is in the form of an annular ring. A plurality of posts 24, preferably three, are provided between the seat 19 and the platform 23.

The platform 23 serves to receive an outer housing 25, which is also made from plastic. This outer housing 25 forms a cover for the thermostatic operating element 10. The outer housing 25 has a lower open end joined by clip connections to the base body 22. For this purpose, the base body 22 has an annular collar 26 extending parallel to the platform, that is provided with at least two detent protrusions 27 that snap in detent fashion into recesses 28 of the outer housing 25.

The annular collar 26 is located above a neck 29, disposed to the side of the platform 23 remote from the mount 20. The neck 29 has seated thereon a union nut 30, by means of which the entire actuator can be secured to the housing of the device 69 to be actuated, such as a valve or the like. Protruding into the neck 29 is the actuating element 69' of the device to be actuated, such as a valve tappet.

The motion of the operating piston 12, which projects out of the housing 11 in the direction away from the platform 23, is transmitted by means of a motion transfer element 31 to the device to be actuated, which is loaded by means of a spring in the direction in which the motion transfer element is supported. When the operating piston 12 moves outward, it moves the actuating element 31 along with it, so that the spring-loaded element of the device to be actuated, such as a valve tappet, follows along with the operating piston 12 as it moves outward.

The motion transfer element 31 comprises two parts 32, 33, of which part 32 is associated with the actuating element of the device to be actuated and part 33 is disposed as a follower of the operating piston 12. The part 32 has a portion in the form of a base plate 34, which extends crosswise to the direction of motion and provides engagement with the actuating element of the device to be actuated. Protruding from the base plate 34 in the direction toward the operating element 10 are three posts 35, which combine to form a partially cylindrical outer contour and which are guided on the inner wall of the neck 29. These posts 35 extend through the platform 23 in recesses in which they are centered circumferentially. The part 33, which like part 32 is made as a plastic molded part, has a base plate 36 serving as a piston engaging portion and acting as a follower for the operating piston 12, from which plate three posts 37 extend toward the platform 23. These posts 37 combine to form a partially cylindrical inner contour, with which they are guided on the partially cylindrical outer contour of the posts 24 of the mount 20.

The two parts 32, 33 of the motion transfer element 31 are interlocked together. The posts 37 of the part 33 associated with the operating piston 12 are provided with recesses 38, into which the ends of the posts 35 are inserted. In addition, the posts 35 and 37 of the parts 32, 33 of the transfer element 31 are joined by clip connections. To that end, tabs 39 with detent protrusions are formed on the posts 37 of the part 33 and snap into recesses 40 of the posts 35 of the part 32.

An annular collar 41 is formed on the posts 37 of the part 33 of the transfer element associated with the operating piston 12. This annular collar 41 acts as an abutment for a compression spring 42, which is contained within the outer housing 25.

The parts 32, 33 of the motion transfer element 31 are preferably formed of molded plastic, such as a conventional polyamid. For example, a suitable polyamid as marketed by BASF under the trade designation Ultramid A3EGT.

An electrical connection cable 43 that includes the two lines 16 and 21 extends through recesses in each of the platform 23 and the annular collar 26 of the base body 22. These recesses are covered by the outer housing 25. This creates a tension relief securement of the cable 43, as will be explained hereinafter in conjunction with the exemplary embodiment of FIGS. 2–8. The base body 22 and the parts 32, 33 of the transfer element 31 heretofore described in relation to the embodiment of FIG. 1 are substantially equivalent to the corresponding elements of the embodiment of FIGS. 2–8, so that with regard to the design of these elements of both embodiments reference may be made to FIGS. 5–8 of the second embodiment.

The embodiment of FIGS. 2–8 is equivalent in its basic structure to the embodiment of FIG. 1, so that when the same parts are used they are provided with the same reference numerals and will not be described again. The essential distinction is that in the embodiment of FIG. 2, an electrical switch 44 that is actuatable by the projection of the operating piston 12 is provided. This electrical switch is disposed between the base plate 36', acting as a follower for the operating piston 12, and the end of the outer housing 25. A switch operating cam 45 associated with the electrical switch 44 is also located in the region between the base plate 36' and the end of the outer housing 25'. The switch 44 and the cam 45 are aligned with one another on guide elements of the base plate 36', or in other words on the same component, so that no problems with regard to tolerances that must be adhered to arise. A frame 46 (FIGS. 4 and 7) is formed on the base plate 36' and has two opposed guide grooves 47, in which ribs 48 of the switch operating cam 45 are guided. In the cam 45, a cylindrical recess 49 extends parallel to the direction in which the operating piston 12 projects, and a compression spring 50 is disposed in this recess. The other end of the compression spring 50 is braced on the base plate 36' and centered by means of a projection 51. The compression spring 50 presses the switch operating cam 45 against the inside of the end of the outer housing 25' and is thereby retained in this position.

Figure 4:
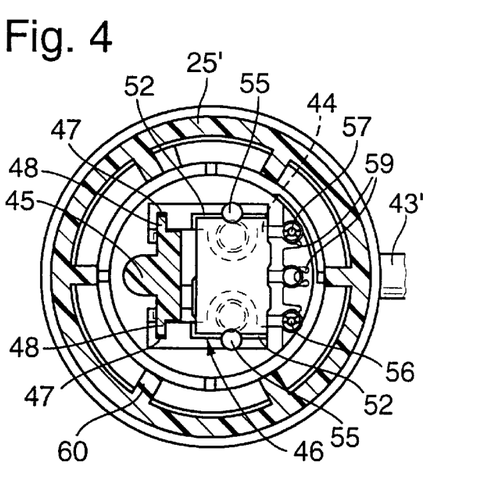
FIG. 4 is a horizontal sectional view taken along line IV—IV of FIG. 2.

The electrical switch 44, which is a microswitch, is seated in recesses 52 of the frame 46. It has two prongs 53, which are inserted in sockets 54 that protrude from the base plate 36'. To fix the switch 44, the frame 46 has two enlargements 55 plastically predeformed by heat in the region of the recesses 52, so that the material of the frame extends into the region of the outside of the switch 44 (FIG. 4). Two electrical lines 56, 57 of the cable 43' are connected to the switch 44.

Figure 3:
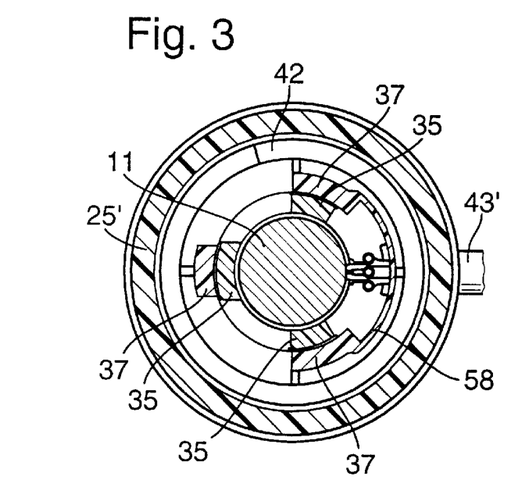
FIG. 3 is a horizontal sectional view taken along line III—III of FIG. 2.
Figure 7:
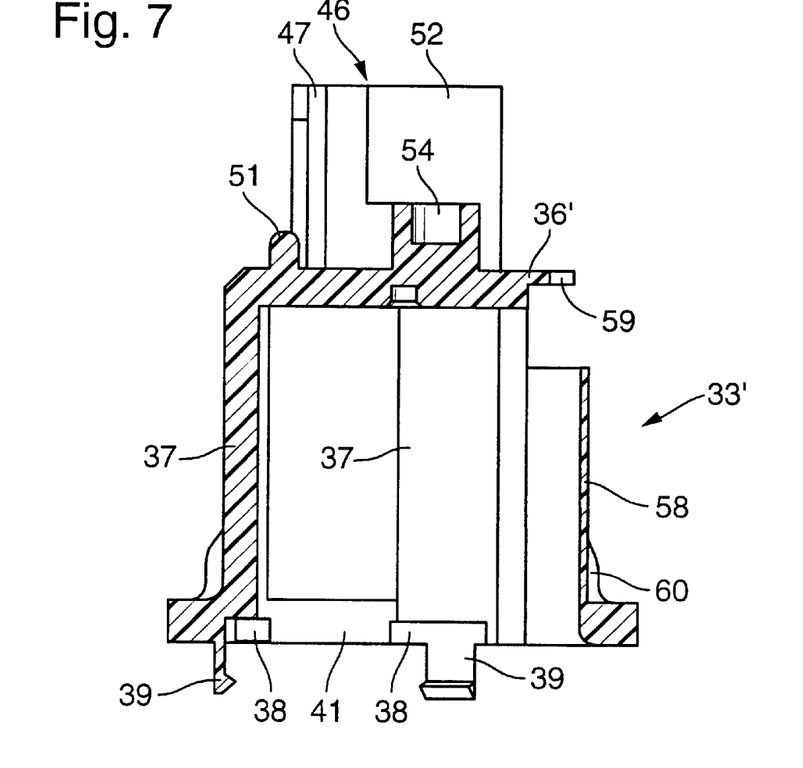
FIG. 7 is a vertical sectional view of a part of the transfer element associated with the operating piston of the thermostatic operating element of the actuator of FIG. 2.
Figure 8:
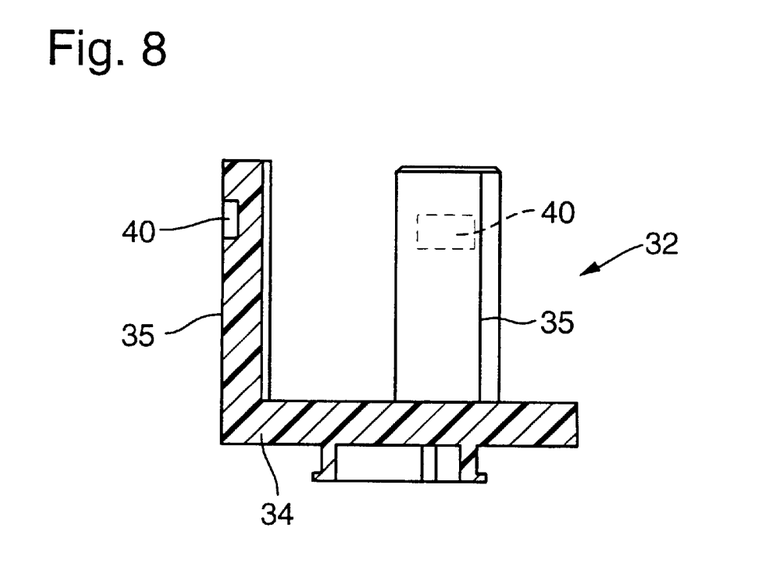
FIG. 8 is a vertical sectional view of a part of the transfer element that engages the device to be actuated.

As can be seen particularly from FIGS. 1, 3 and 7, in the region in which the electrical lines 16, 21, 56, 57 extend to the heating element 13 and the switch 44, a shield portion 58 is provided, which shields the electrical lines from the restoring spring 42. This shield portion 58 is formed on the part 33' of the actuating element and extends between two posts 37 of this part 33'. The base plate 36' is provided with clamping holders 59, in which the lines 56, 57 are fixed.

Figure 2:
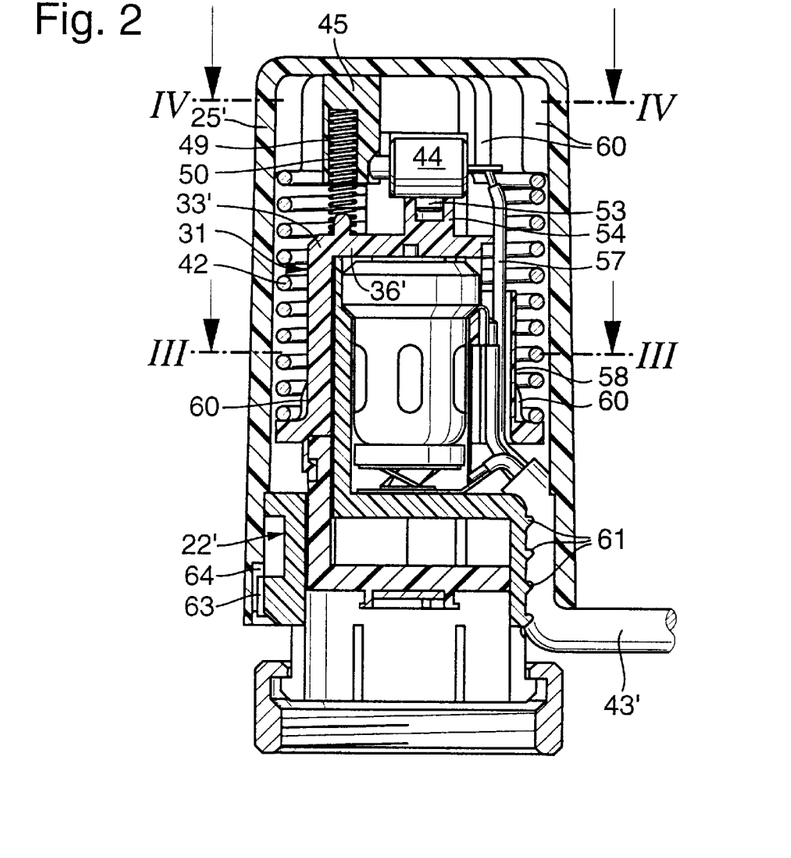
FIG. 2 is a vertical sectional view of a second embodiment of the actuator of the present invention incorporating an electrical switch.

As can be seen from FIG. 2, the outer housing 25' is provided on the inside with ribs 60 that extend from the closure and protrude from the inner walls, forming an abutment for the compression spring 42. Ribs 60 are also provided in the region of the annular collar 41 on the part 33' of the actuating element 31; they center the restoring spring 42, so that a cylindrical restoring spring 42 can be properly positioned.

Figure 5:
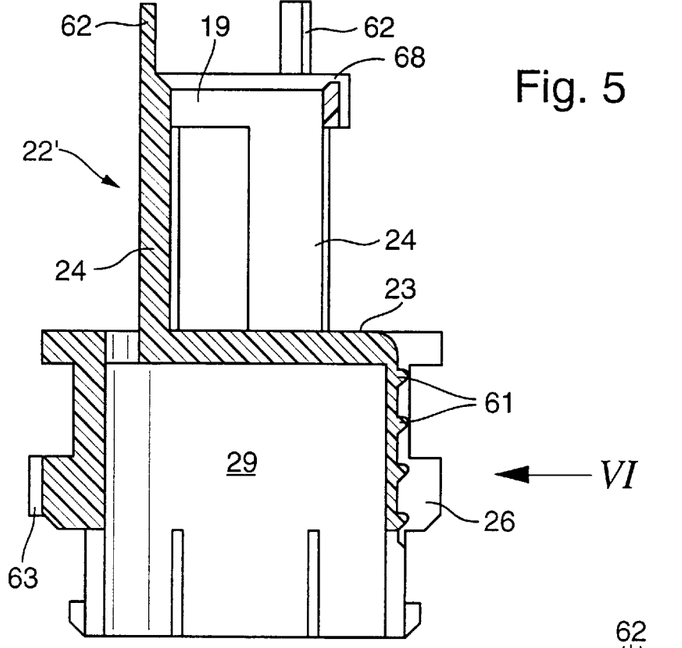
FIG. 5 is a vertical sectional view of a base body of the actuator of FIG. 2.
Figure 6:
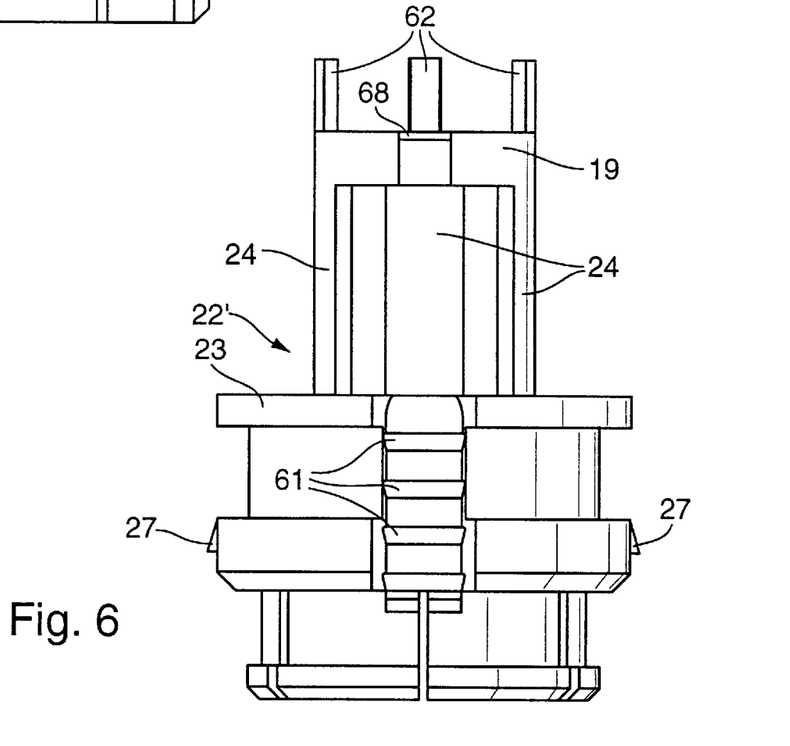
FIG. 6 is an elevational view of the base body of FIG. 5 as viewed in the direction of the arrow VI of FIG. 5.

As seen particularly in FIGS. 2, 5 and 6, the base body 22' is provided in the region of the platform 23 with a lateral recess, which also extends across the annular collar 26. This recess is provided with a plurality of relatively sharp-pointed ribs 61. The outer housing 25' covers the region of this recess and binds the cable 43' pressed inward into the ribs 61 for tension relief securement of the cable 43'.

As can also be seen from FIGS. 5 and 6, enclosure posts 62 extend upwardly from the seat 19 to form a socket for the annular flange 18 of the housing 11 of the operating element 10, the seat 19 being in the form of a continuous annular tapered surface. The seat 19 is also provided with a recess 68, as can be seen from FIGS. 5 and 6, at which a connection terminal for the contact ring 17 for the associated line 21 is extended to the outside.

The annular collar 26 of the base body 22', which is disposed in the region of the neck 29, is also provided with an outward-pointing protrusion 63, with which a recess 64 of the outer housing 25' is associated. This assures that the outer housing 25' can be slipped on completely only in a position in which the clip connection 27, 28 can be engaged.

In a modified embodiment it is provided that the electrical switch 44, while being guided on the base plate 36' of the part 33' of the actuating element 31, is however supported on the closure of the outer housing 25'. In that case, the associated switch operating cam 45 can be formed integrally with the base plate 36'. This modified embodiment has the advantage that not only the electrical heating element 13 and the electrical lines 16, 21 leading to it but also the electrical switch 44 and the electrical lines 56, 57 remain stationary and are not subject to the motion of the transfer element 31.

The actuator of the present invention may be used to advantage in particular to adjust radiator valves for room heating. A temperature sensor, which is disposed at some suitable point in the room to be heated, senses a drop in room temperature below a preset temperature and functions to supply current to the electric heating element 13. Because of the heating and the resulting expansion of the expandable material in the housing 11, the operating piston 12 is projected outward counter to the action of the compression spring 42. The device to be actuated, in this case a valve tappet of the radiator valve, is loaded by a spring element and follows the motion of the actuating element 31. In this case, the valve, which is closed as long as the heating element 13 has no current, opens. Once the desired temperature is reached, the current to the heating element 13 is shut off. The thermostatic operating element 10 thereupon cools down, so that the piston is pressed back into the housing 11 by means of the compression spring 42, which is designed such that it is markedly stronger than the spring member of the device to be actuated, and so the element of the device to be actuated is forced back into the position shown in FIG. 1 or FIG. 2; that is, the radiator valve is closed.

Figure 9:
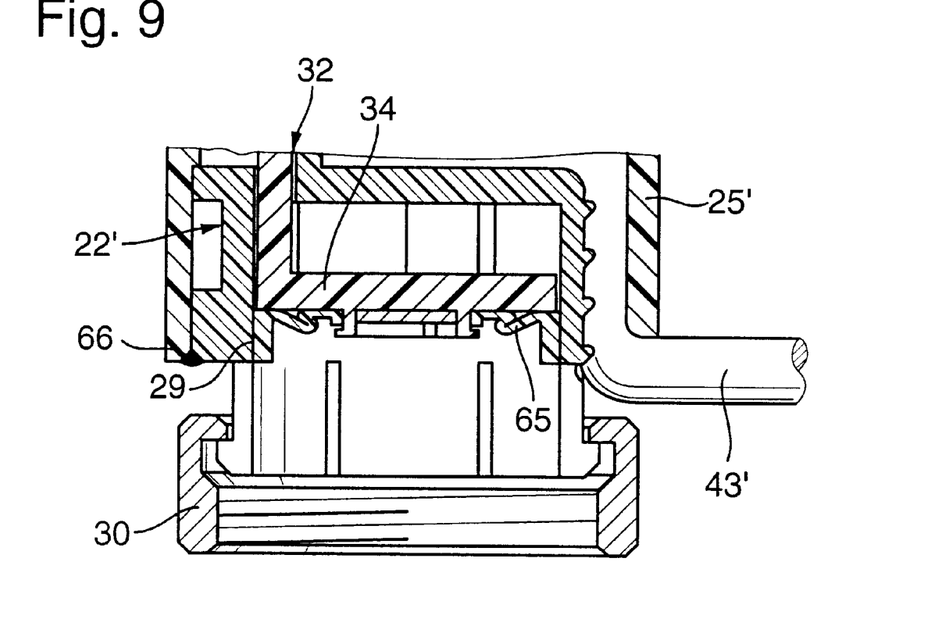
FIG. 9 is a fragmentary vertical sectional view of the actuator of FIG. 2, illustrating seals for sealing the actuator against the entry of moisture.
Figure 10:
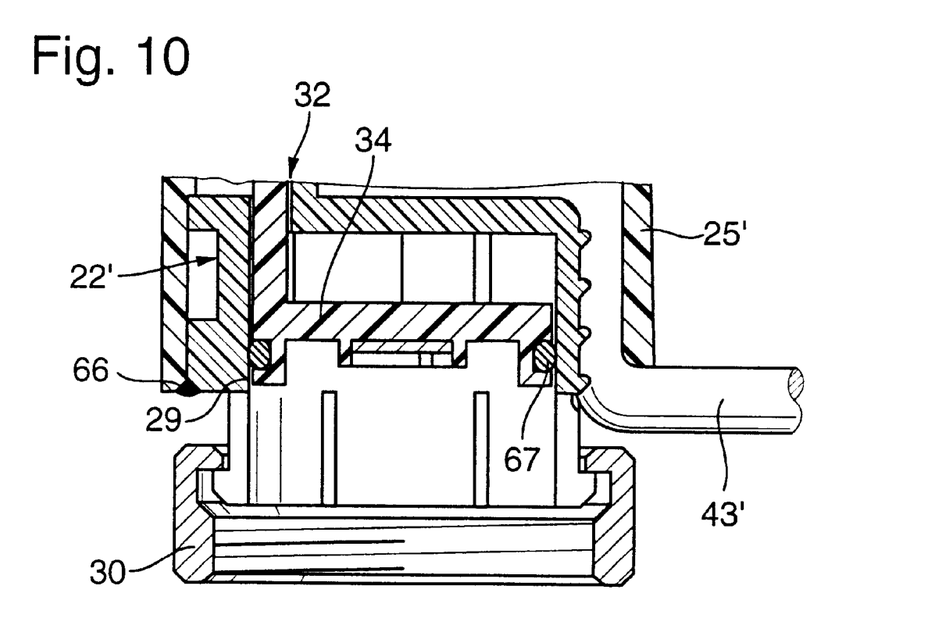
FIG. 10 is a fragmentary axial vertical sectional view of the actuator of FIG. 2 illustrating an alternative seal for sealing the actuator against the entry of moisture.

In such an application it is advantageous if the actuator is protected against entry of fluid, especially moisture or water escaping from the radiator valve. As shown in FIGS. 9 and 10, this can be accomplished by simple means in the embodiment shown.

In the embodiment of FIG. 9, an annular sealing cuff 65 is disposed between the neck 29 and the base plate 34 of the part 32 of the actuating element 31. In addition, the outer housing 25' is sealed from the base body 22' in the region of the annular collar 26 by means of a sealing composition 66, preferably a permanently elastic sealing composition. This sealing composition is also provided in the region of the cable 43', so that secure sealing is achieved there as well.

In the embodiment of FIG. 10, the sealing is effected in the region of the base plate 34, by means of an O-ring seal 67 that seals the base plate 34 in the neck 29.

Figure 11:
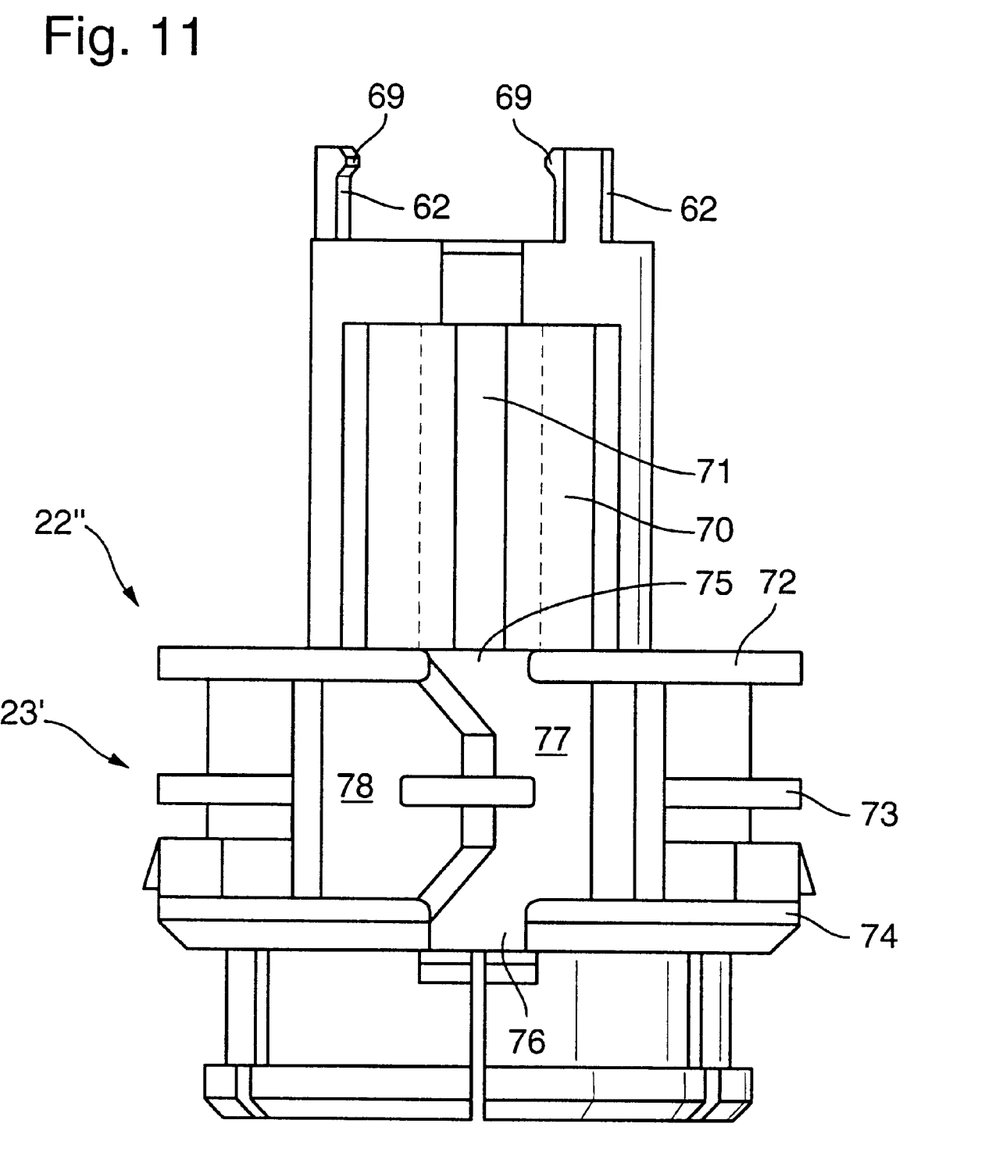
FIG. 11 is an elevational view similar to FIG. 6 and illustrating a modified base body.

The base body 22' shown in FIG. 11 is provided, at the enclosure posts 62, with inward-pointing detent protrusions 69, so that the annular flange 18 of the housing 11 of the operating element 10 is locked in the seat 19 in detent fashion. This assures secure contact with the contact ring 17 during assembly.

A thin partition is also provided between two posts 24 that surround the housing 11 of the operating element; this partition leaves open only a slit 71, through which the electrical connection lines 16, 21 extend.

In the exemplary embodiment of FIG. 11, the platform 23' is formed with three annular collars 72, 73, 74, which form two tension relief securements for the cable 43 or 43', not shown. The upper annular collar 72 and the lower annular collar 74 are each provided with aligned recesses 75, 76. The middle annular collar 73, conversely, is provided with two laterally offset recesses 77, 78. In the region of one recess 77, the wall thickness is less than in the region of the other recess 78. The recesses 75, 77 and 76 on the one hand form a tension relief securement for a first cable, in particular a four-strand cable, while the recesses 75, 78 and 76 form a tension relief securement for a thinner cable, in particular a two-strand cable. In this case, the cables are placed suitably in the recesses so that they clamp together. This clamping action is further reinforced when the outer housing 25 is mounted, which reinforces the region of these securements.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and equivalents thereof.

We claim:

1. An actuator comprising a stationary base body having a platform, an electrically heatable thermostatic operating element supported on said stationary base body platform and having a piston moveable in response to heating and cooling of said operating element, said base body being securable to a device to be actuated, a motion transfer element disposed within said actuator and extending through said platform, said transfer element having a part extending from one side of said platform and forming a follower for said operating element piston and a part extending from the other side of the platform for actuating engagement with a movable actuating element of the device being actuated, said two parts of said motion transfer element being formed of molded plastic, said actuator includes a housing, and the part of said transfer element that follows said operating piston is biased in following relation to said piston to maintain following relation to said piston and to cause return of said piston upon cooling of said operating element by a compression spring that is supported in said housing, said transfer element form an annular chamber therebetween for containing said spring, and said part of the transfer element forming the follower for said operating piston is formed with an annular collar against which the spring is seated.

2. The actuator of claim 1, wherein said two parts of said motion transfer element are interlocked.

3. The actuator of claim 1, wherein said part of the transfer element that extends for engagement with the movable actuating element of the device to be actuated has a portion forming the engagement with said actuating element of said device and from which a plurality of posts extends through said platform of the base body and is interlocked to the other part of the transfer element.

4. An actuator comprising a stationary base body having a platform, an electrically heatable thermostatic operating element supported on said stationary base body platform and having a piston moveable in response to heating and cooling of said operating element, said base body being securable to a device to be actuated, a motion transfer element disposed within said actuator and extending through said platform, said transfer element having a part extending from one side of said platform and forming a follower for said operating element piston, and a part extending from the other side of the platform for actuating engagement with a movable actuating element of the device being actuated, said part of the transfer element that extends for engagement with the movable actuating element of the device to be actuated has a portion forming the engagement with said actuating element of said device and from which a plurality of posts extends through said platform of the base body, and said part of said transfer element forming the follower of said piston has a portion engaging said piston from which a plurality of posts project in the direction of the other part and is interlocked to the posts of the other part.

5. The actuator of claim 4, wherein said two parts of said motion transfer element are formed of molded plastic.

6. The actuator of claim 3, wherein the part of the transfer element forming the engagement with the actuating element of the device being actuated is centered and guided by said posts in recesses of said base body platform.

7. The actuator of claim 1, wherein said base body forms a mount for said operating element and the part of said transfer element that forms the follower of said operating piston is guided on said mount.

8. The actuator of claim 4, wherein the ends of the posts of the one part engage the ends of the posts of the other part of the transfer element.

9. The actuator of claim 8, wherein the two parts of the transfer element are braced against one another on a face extending substantially crosswise to the transmission direction of a force.

10. The actuator of claim 8, wherein the two parts of the transfer element are maintained against moving apart by at least one clip connection.

11. The actuator of claim 4, wherein said base body forms a cylindrical mount for said operating element and the posts of the two parts of the transfer element are provided with partially cylindrical inside faces disposed for being guided on the outer face of the cylindrical mount.

12. The actuator of claim 11, wherein said operating element is formed with an annular flange and said mount is formed by a plurality of posts extending from said platform with said posts forming an annular seat for said annular flange.

13. The actuator of claim 12, wherein a plurality of posts extend from said seat to form a socket therewith to seat therein the annular flange of the operating element in detent fashion.

14. The actuator of claim 13, wherein said posts of said mount extend parallel to the posts of said transfer element and form a partially cylindrical outer face.

15. The actuator of claim 12, wherein the platform of the base body is provided with a lateral recess for disposition therein of an electrical cable that extends between the posts of the mount and the posts of the transfer element for connection to said operating element.

16. The actuator of claim 15, wherein said actuator includes a housing covering said recess of the platform and forming with the recess a tension relief securement for the cable.

17. The actuator of claim 16, wherein a shield portion is formed between two posts of the part of the transfer element that follows the operating piston, which shield portion shields said electrical cable from said compression spring.

18. The actuator of claim 1, wherein said base body is formed with a neck extending from the platform of the base body for securement on the device to be actuated and providing a seal for the part of the transfer element forming the actuating connection to the device.

19. The actuator of claim 18, wherein said actuator includes a housing and a seal provided between the platform of the base body and the housing.

20. The actuator of claim 1, wherein an electrical switch is disposed in said actuator for actuation in response to motion of the transfer element.

21. The actuator of claim 20, wherein said actuator includes a housing and a switch-operating cam, and said electrical switch and operating cam are disposed between the part of the transfer element that follows the operating piston and the housing.

22. The actuator of claim 21, wherein the switch operating cam and the electrical switch are adjustable relative to one another.

23. The actuator of claim 1, wherein a heat resistance heating disc is mounted between said operating element and said platform, a contact spring is mounted between said heating disc and said platform, a contact plate is disposed between said contact spring and said platform, and said electrical cable is connected to said contact plate for electrical connection to said heating disc through said contact plate and contact spring for heating of said operating element thereby.

* * * * *

UNITED STATES PATENT AND TRADEMARK OFFICE
CERTIFICATE OF CORRECTION

PATENT NO. : 5,897,055
DATED      : April 27, 1999
INVENTOR(S): Saur et al.

It is certified that error appears in the above-identified patent and that said Letters Patent is hereby corrected as shown below:   On the title page:

Item 22 filed:  Change February 12, 1997 to February 12, 1998.

Item 30:  Change priority date from February 14, 1996 to Februry 14, 1997.

Signed and Sealed this

Seventh Day of December, 1999

Attest:

Q. TODD DICKINSON

*Attesting Officer*           *Acting Commissioner of Patents and Trademarks*